US012644992B2

(12) United States Patent
Berkovitch et al.

(10) Patent No.: US 12,644,992 B2
(45) Date of Patent: Jun. 2, 2026

(54) LIGHT DETECTION AND RANGING SYSTEM HAVING A MOUNTING CONNECTION AND METHOD OF FORMING THE SAME

(71) Applicant: Intel Corporation, Santa Clara, CA (US)

(72) Inventors: Nikolai Berkovitch, Haifa (IL); Vladimir Malamud, Hedera (IL); Konstantin Matyuch, Netanya (IL); Yoav Magrisso, Hadera (IL); Gal Dvoretzki, Hod Hasharon (IL); Ron Friedman, Givat Oz (IL); Israel Petronius, Haifa (IL)

(73) Assignee: Intel Corporation, Santa Clara, CA (US)

( * ) Notice: Subject to any disclaimer, the term of this patent is extended or adjusted under 35 U.S.C. 154(b) by 283 days.

(21) Appl. No.: 17/471,215

(22) Filed: Sep. 10, 2021

(65) Prior Publication Data

US 2021/0405206 A1 Dec. 30, 2021

(51) Int. Cl.
*G01S 17/933* (2020.01)
*B23K 26/06* (2014.01)
(Continued)

(52) U.S. Cl.
CPC ........ *G01S 17/933* (2013.01); *B23K 26/0604* (2013.01); *B23K 31/003* (2013.01);
(Continued)

(58) Field of Classification Search
CPC .... G01S 17/933; G01S 7/4813; G01S 7/4814; G01S 7/4817; B23K 26/02; B23K 26/0604; B23K 31/003; G02B 7/003
See application file for complete search history.

(56) References Cited

U.S. PATENT DOCUMENTS

| | | | | |
|---|---|---|---|---|
| 11,353,556 | B2 * | 6/2022 | Pacala | ................ H04B 10/1143 |
| 11,493,691 | B1 * | 11/2022 | Wood | .................. G02B 6/4246 |
| 2021/0318507 | A1 | 10/2021 | Oh | |

FOREIGN PATENT DOCUMENTS

| | | |
|---|---|---|
| DE | 102014224416 A1 | 6/2015 |
| DE | 202020105844 U1 | 10/2020 |

(Continued)

OTHER PUBLICATIONS

The extended European search report for European patent application No. 22180649.0, dated Dec. 20, 2022 10 Pages (For informational purposes only).

*Primary Examiner* — Isam A Alsomiri
(74) *Attorney, Agent, or Firm* — Viering, Jentschura & Partner mbB

(57) ABSTRACT

A light detection and ranging system including a mounting connection of a lens system in a mounting structure, including a lens system mounted in the mounting structure, the mounting connection including that the mounting structure includes at least one alignment opening, and the lens system includes a mounting shaft configured to mount the lens system in the mounting structure, wherein the alignment opening laterally surrounds the mounting shaft at least in part spaced apart in an alignment distance from the mounting shaft in the predefined alignment condition; and a spacer configured to span at least in part the alignment distance, wherein the mounting shaft is fixed in the alignment condition in the alignment opening by a first connection that fixes the spacer to the mounting structure, and by a second connection that fixes the spacer to the mounting shaft.

25 Claims, 7 Drawing Sheets

(51) Int. Cl.
    B23K 31/00       (2006.01)
    G01S 7/481       (2006.01)
    G02B 7/00        (2021.01)

(52) U.S. Cl.
    CPC .......... G01S 7/4813 (2013.01); G01S 7/4814
           (2013.01); G01S 7/4817 (2013.01); G02B
                       7/003 (2013.01)

(56)                 References Cited

FOREIGN PATENT DOCUMENTS

| JP | 2007305980 | A | | 11/2007 |
| JP | 2020190667 | A | * | 11/2020 |
| WO | 2021133445 | A1 | | 7/2021 |

* cited by examiner

100

108

102

104

114

106

112    110

$$F = L_c + L_p - L_g$$
$$\Delta F = L_c \alpha_c \Delta T + L_p \alpha_p \Delta T - L_g \alpha_g \Delta T$$
$$\Delta F = \Delta T (L_c \alpha_c + L_p \alpha_p - L_g \alpha_g)$$
$$L_c \alpha_c + L_p \alpha_p - L_g \alpha_g = 0$$

LIGHT DETECTION AND RANGING SYSTEM HAVING A MOUNTING CONNECTION AND METHOD OF FORMING THE SAME

TECHNICAL FIELD

This disclosure generally relates to the field of light detection and ranging systems.

BACKGROUND

A Photonic Integrated Circuit (PIC) is desirable for coherent light detection and ranging (LIDAR) due to the promise of low cost and scalability to high volume. However, due to PIC limitations (size, yield, cost), the number of vertical channels (resolution elements) is limited (~10's). By using a multiple (M) wavelength laser source and a diffraction grating, for example, the number of LIDAR channels can be increased by a factor of M for a given PIC to achieve a desired high number (>100) of vertical resolution elements or pixels.

In a conventional LIDAR, optical components are arranged in front of the PIC for beam position control. The optical components include a lens system to adjust the beam from the PIC. The lens system is arranged in a lens barrel in the light path of the PIC. The lens barrel requires an active alignment. The active alignment of the lens barrel requires a very sensitive feedback signal during alignment. In the end of the alignment process, a very strong and reliable fixation of the lens barrel is required to hold the heavy lens barrel in position under a wide range of mechanical and thermal stresses, e.g., in automotive applications.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

The LIDAR system may be used as a component in an autonomous vehicle, autonomous robot, or autonomous unmanned aerial vehicle (UAV) or drone, to sense objects, internally as well as externally. The LIDAR system may also be used for assistance systems in vehicles, robots, UAVs or drones. The LIDAR system may be part of a multimodal sensing system, operating alongside or in combination with cameras, radar, ultrasound, or mm-wave ultrawideband (UWB). Navigation and autonomous or assisted decision-making may be based wholly or in part on the LIDAR system. In addition, the LIDAR system may be used in mobile devices such as smartphones, tablets or laptops for purposes including object, person, posture or gesture detection.

The following detailed description refers to the accompanying drawings that show, by way of illustration, specific details and aspects in which the invention may be practiced.

The term "as an example" is used herein to mean "serving as an example, instance, or illustration". Any aspect or design described herein as "as an example" is not necessarily to be construed as preferred or advantageous over other aspects or designs.

For frequency modulated continous wave (FMCW) LIDAR applications, receiving (Rx) signals and transmitted (Tx) signals may be used for lens alignment. For Rx signals, a statistical measurement method may be used to remove speckles effect. For Tx signals, shear interferometer fringes analysis may provide very sensitive feedback on lens location. After aligning the lens system in a predefined alignment position, the lens system may be fixed in the position using a spacer and a mounting connection. The mounting connection may be formed using a dual-beam laser welding technique through an intermediate spacer.

Accurate and reliable alignment between free space optics, e.g. the lens system, and the PIC may provide an ability to build a compact and multi-functional optical solution.

Figure 1:
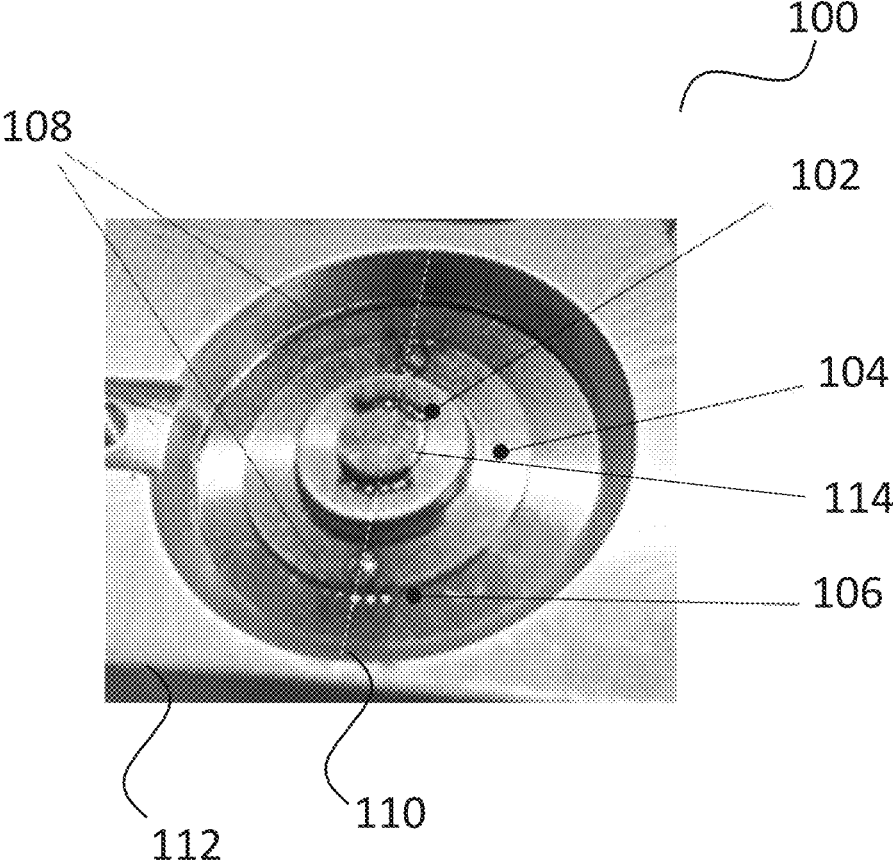
FIG. 1 illustrates a picture of a mounting connection of a LIDAR system.

FIG. 1 illustrates a picture of a mounting connection 100 of a mounting shaft 114 of lens system in a mounting structure 112 of a LIDAR system. The lens system may be fixed to the mounting structure 112 using a spacer 104. The spacer 104 may function to bridge (also denoted as span) the distance between the mounting structure 112 and the mounting shaft 114 for the mounting connection 100. The spacer 104 may be welded to the lens system 220 and the mounting structure 112 using a first welding connection 106 and a second welding connection 102. However, other connections than welding connections may also be used instead, e.g. a solder connection. In the shown example, a dual beam laser welding method forms the mounting connection 100 that is described in more detail below. The mounting connection 100 may include welding points 102 106, 108, e.g. located on a straight line 110 that passes thru a welding center, e.g. of a mounting shaft 114 of the lens system. The wellding connections may be welding thru and fillet dots 108, as an example.

Laser welding may form the mounting connection 100, and may provide a strong connection to fix the lens system in the mounting structure 112 after active alignment. This way, the mounting connection may be capable to withstand vibrations and accelerations of an automotive LIDAR system.

Figure 2:
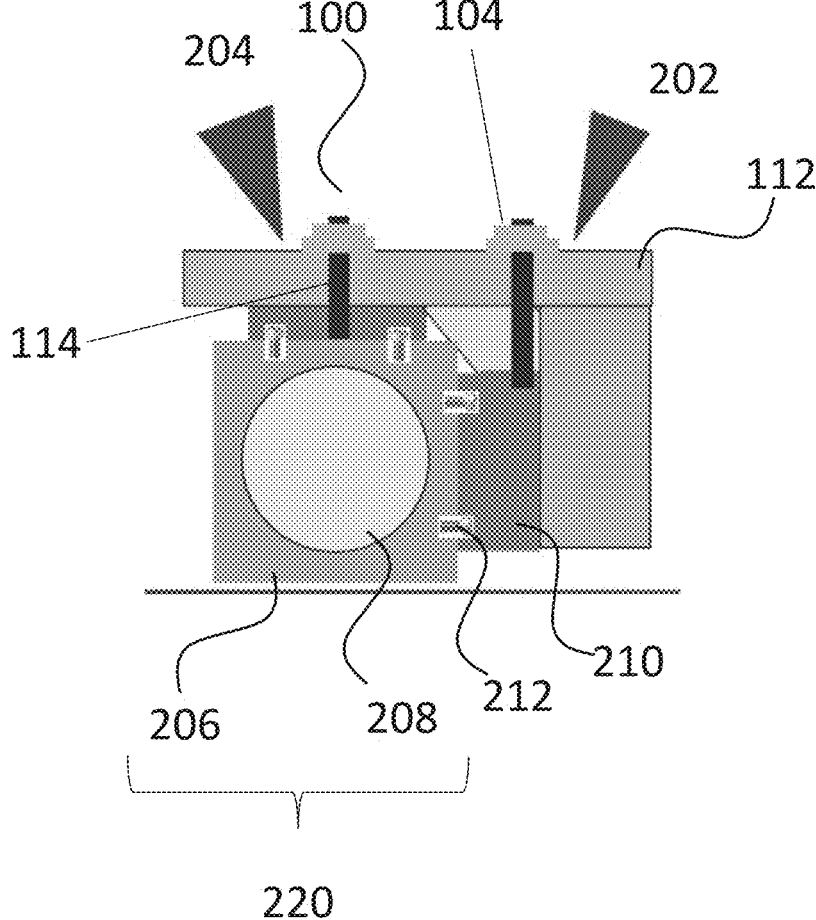
FIG. 2 to FIG. 4 illustrate schematic diagrams of a mounting connection of a LIDAR system.

FIG. 2 illustrates a schematic front view of a lens system 220 mounted in a mounting structure 112 using at least one mounting connection 100 as described above.

The lens system 220 may include at least one lens 208 mounted in a housing 206. The mounting shafts 114 may be coupled to the housing 206, e.g. using a spacing structure 210 fixed to the housing 206 via screw connections 212.

As an example of a laser welding to form the mounting connection 100, a dual beam laser welding process may form the mounting connection (see FIG. 2), and may minimize the shift of a lens 208 of the lens system 220 during the welding process. Dual beam laser may include welding with two equal laser beams 202, 204 simultaneously from opposite direction, as illustrated in FIG. 2. This way, dual beam laser welding may compensate momentum and welding forces of each one of the beams.

As an example, a welding direction may be perpendicular to the optical axis of the lens of the lens system 220, as illustrated in FIG. 2. This way, the effect of welding shift may be minimized.

The lens system 220 may be aligned relative to the PIC in the predetermined alignment position before forming the mounting connection. The alignment process may be a lens active alignment process. The lens active alignment process may be performed using a Tx signal and/or Rx signal of the PIC. Here, the PIC may be configured providing optical functionality for the LIDAR system, and the Tx signal may be the signal send by the PIC and the Rx signal may be the signal received by the PIC.

In the alignment process, a shear interferometer may be used to analyze the quality of collimation and lens tilt relative to the PIC. This way, Tx signal sensitivity may be provided.

As an example, a regular silicon (Si) complementary metal oxide semiconductor (CMOS) camera and a fluorescent screen transforming infrared (IR) 1.3 μm wavelength to visible red light may determine the Tx signal. Strong green light emitting diode (LED) pump pulses may charge the fluorescent screen. This way, compared to commonly used expensive and low-resolution SWIR cameras, the Si CMOS camera with the fluorescent screen provide better resolution and flexibility.

Figure 3:
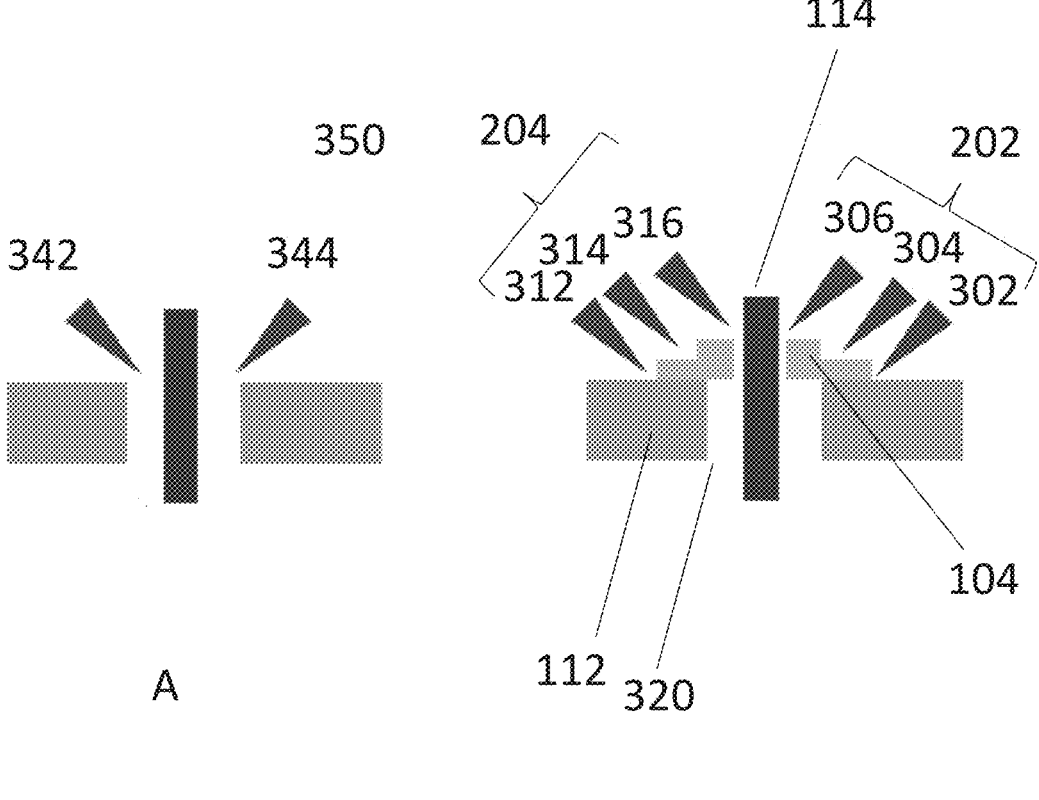

During the active alignment process, the lens system 220 may be moved by hundreds of microns and several degrees in each direction to compensate assembly tolerances. Such constrain requires welding thru large gaps of several hundreds of microns between parts, which can commonly hardly be done, e.g. a maximal recommended gap for welding is below 100 μm (see also FIG. 3A and FIG. 3B).

FIG.3A illustrates a schematical cross section of a dual beam laser welding process of a comparative example, and FIG.3B illustrates a schematical cross section of an example of a mounting connection using the spacer 104. Here, the mounting shaft 114 is arranged in the alignment opening 320 of the mounting structure 112. The alignment opening 320 is formed that sufficient space (also denoted as alignment space) is provided between the mouting shaft 114 and the mounting structure 112 for the active alignment process. The spacer 104 is configured and attached to the mounting shaft 114 to span (also denoted as cover or bridge) the alignment space. Then, after aligning the lens system 220 in the predefined alignment position relative to PIC, the spacer 104 may be fixed to the mounting shaft 114 and the mounting structure 112. However, the spacer 104 may include two or more parts or sections that are connected or fixed 304, 314 to each other.

Illustratively, the spacer 104 may bridge the assembly gap of the comparative example. The spacer 104 may be assembled on a mounting shaft 114 connected to the lens system 220. The spacer 104 and the mounting shaft 114 may be free to move in the alignment opening of the mounting structure 112 during the active alignment proceeds. After the active alignment proceeds, when the lens system 220 is adjust in the predetermined alignment position, the spacer 104 may be welded to the mounting shaft 114 via a second welding connection 102, 306, 316, and the spacer 104 may be welded to the mounting structure 112 via a first welding connection 106, 302, 312 (see FIG. 1 and FIG. 3B). This way, flexibility of the active alignment process, and small gaps between parts for reliable welding are achieved.

In other words regarding FIG. 1 to FIG. 3B, the LIDAR 200 system may include a mounting connection 100 of a lens system 220 in a mounting structure 112. The LIDAR 200 system may include a packaging structure 404 (see also FIG. 4) that may include an optical window (e.g. a structure configured to transmit light to and from the PIC to the outside of the LIDAR system 200) and the mounting structure 112. The LIDAR system 200 may further include a lens system 220 mounted in the mounting structure 112. The lens system 220 may be arranged in the mounting structure 112 according to a predefined alignment condition on or above the optical window. The mounting connection 100 may include that the mounting structure 112 may include at least one alignment opening 320, and the lens system 220 may include a mounting shaft 114 configured to mount the lens system 220 in the mounting structure 112. The alignment opening 320 may laterally surround the mounting shaft 114 at least in part spaced apart in an alignment distance from the mounting shaft 114 in the predefined alignment condition. The mounting connection 100 may further include a spacer 104 configured to span at least in part the alignment distance. The mounting shaft 114 may be fixed in the alignment condition in the alignment opening 320 by a first welding connection 106, 302, 312 that fixes the spacer 104 to the mounting structure 112, and by a second welding connection 102, 306, 316 that fixes the spacer 104 to the mounting shaft 114.

The alignment distance may be larger than 50 μm, e.g. the alignment distance may be in a range of about 100 μm to 1 mm.

The mounting shaft 114 may be arranged perpendicular to a lens focus axis of the lens system 220.

The first welding connection 106, 302, 312 may include welding connections 302, 312 at laterally opposing positions regarding the mounting shaft 114.

The second welding connection 102, 306, 316 may include welding connections 306, 316 at laterally opposing positions regarding the mounting shaft 114.

The spacer 104 may include the shape of a ring or a washer, e.g. the spacer 104 may include an opening, wherein the mounting shaft 114 may be arranged in the opening.

The mounting shaft 114 may be spaced apart in at least in part in a second distance from the spacer 104. The second distance may be less than about 50 μm.

The spacer 104 may include a step-like or tapered shape forming a step-like or tapered structure from a surface of the mounting structure 112 towards a distal end of the mounting shaft 114. This way, a mechanical stability of the mounting shaft 114 and/or the mounting connection 100 is improved.

The mounting shaft 114 may include a cylindrical shape, e.g. the mounting shaft 114 may be a pin.

The PIC may be arranged in the packaging structure 404. The PIC 600 may be configured to emit a coherent electromagnetic radiation through the optical window to the outside and to receive a coherent electromagnetic radiation from the outside through the optical window at the PIC 600.

The lens system 220 may include a plurality of lens arranged in a housing 206. The packaging structure 404 may include a gold box.

As example, the LIDAR system 200 may include a first mounting connection 100 and a second mounting connection 100 each configured as described above. The mounting shaft 114 of the first mounting connection 100 may be coupled to a first side of the lens system 220. The mounting shaft 114 of the second mounting connection 100 may be coupled to a second side of the lens system 220 that is about perpendicular to the first side of the lens system 220.

The alignment opening 320 of the first mounting connection 100 and the alignment opening 320 of the second mounting connection 100 may be arranged on the same side of mounting structure 112.

Depending on the application, the mounting connection may be supposed to withstand mechanical and thermal stress. Temperature changes may cause a shift between the lens system and the PIC. Thermal design of the components of the mounting connection may be used to minimize the thermal shift. As an example, coefficients of linear thermal expansion (CTEs) of materials in conjunction with their effective thermal path length, e.g. measured relatively to a reference point in assembly of PIC, may be balanced to minimize displacement of the lens of the lens system relative to PIC due to thermal stresses (see FIG. 4).

Figure 4:
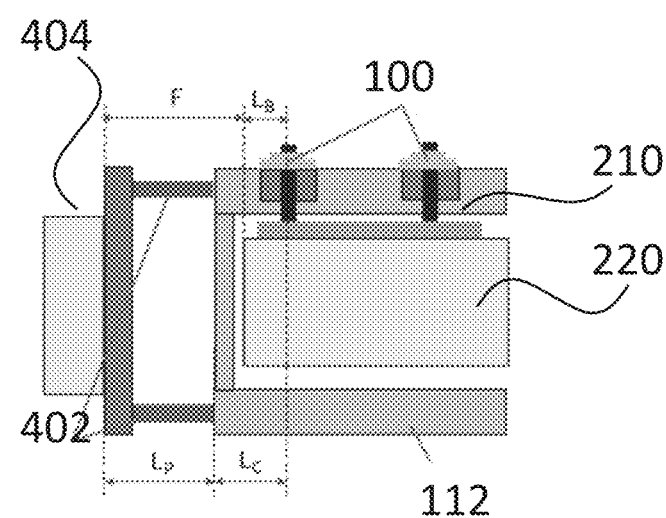

FIG. 4 illustrates a schematic top view of a lens system 220 mounted in a mounting structure 112 using one or more mounting connections 100 per side of the lens system 202. As an example, a combination of an aluminum mounting structure 112, e.g. an optical bench; stainless steel, and spacer structures (KOVAR) 402, and a gold box as a packaging structure for the PIC may balance the thermal budget of the mounting connection and the alignment of the lens system relative to the PIC.

Figure 5:
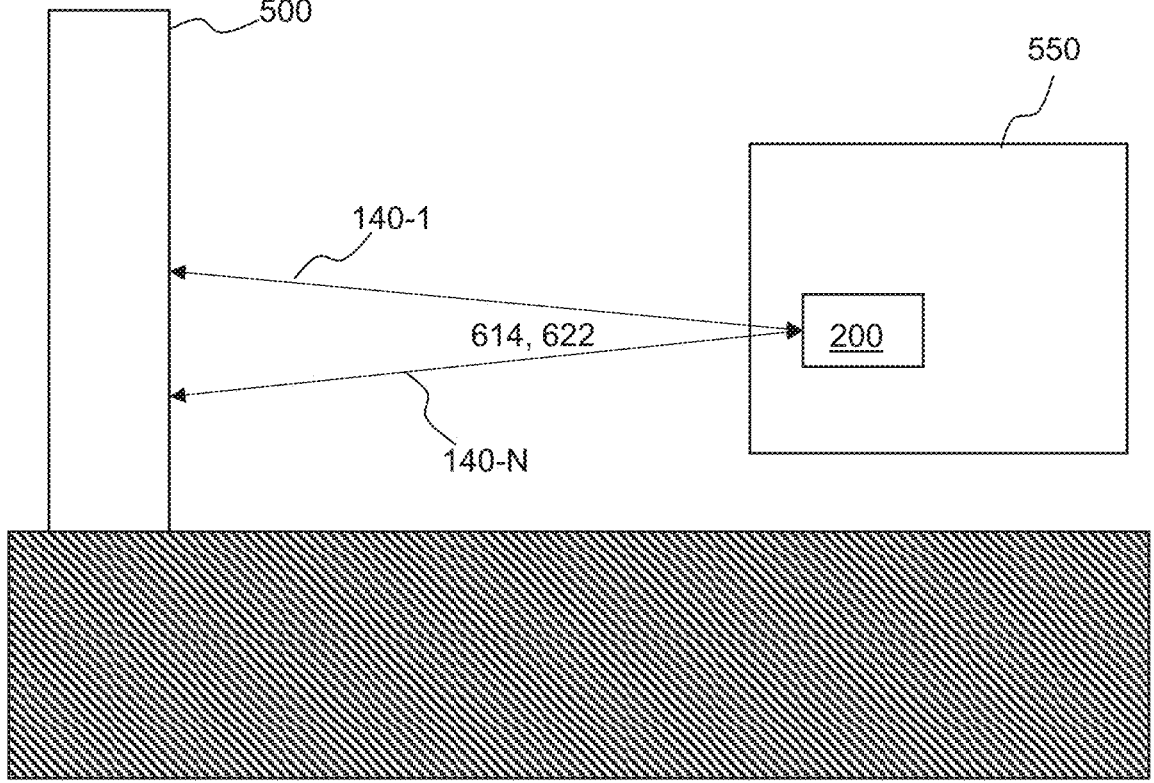
FIG. 5 illustrates a schematic diagram of a vehicle having a LIDAR system.

FIG. 5 illustrates a schematic diagram of a vehicle 550 having a LIDAR system 200 integrated therein, as an example. The vehicle 550 may be an unmanned vehicle, e.g. unmanned aerial vehicle or unmanned automobile. The vehicle 550 may be an autonomous vehicle. Here, the LIDAR system 200 may be used to control the direction of travel of the vehicle 550. The LIDAR system 200 may be configured for obstacle detection outside of the vehicle 550, as an example. Alternatively or in addition, the vehicle 550 may require a driver to control the direction of travel of the vehicle 550. The LIDAR system 200 may be a driving assistant. As an example, the LIDAR system 200 may be configured for obstacle detection, e.g. determining a distance and/or direction and relative velocity of an obstacle (target 500) outside of the vehicle 550. The LIDAR system 200 may be configured, along one or more optical channels 140-$i$ (with i being one between 1 to N and N being the number of channels of the PIC), to emit light 614 from one or more outputs of the LIDAR system 200, e.g. outputs of the light paths, and to receive light 622 reflected from the target 500 in one or more light inputs of the LIDAR system 200. The structure and design of the outputs and inputs of the light paths of the LIDAR system 200 may vary depending on the working principle of the LIDAR system 200. Alternatively, the LIDAR system 200 may be or may be part of a spectrometer or microscope. However, the working principle may be the same as in a vehicle 550.

Figure 6:
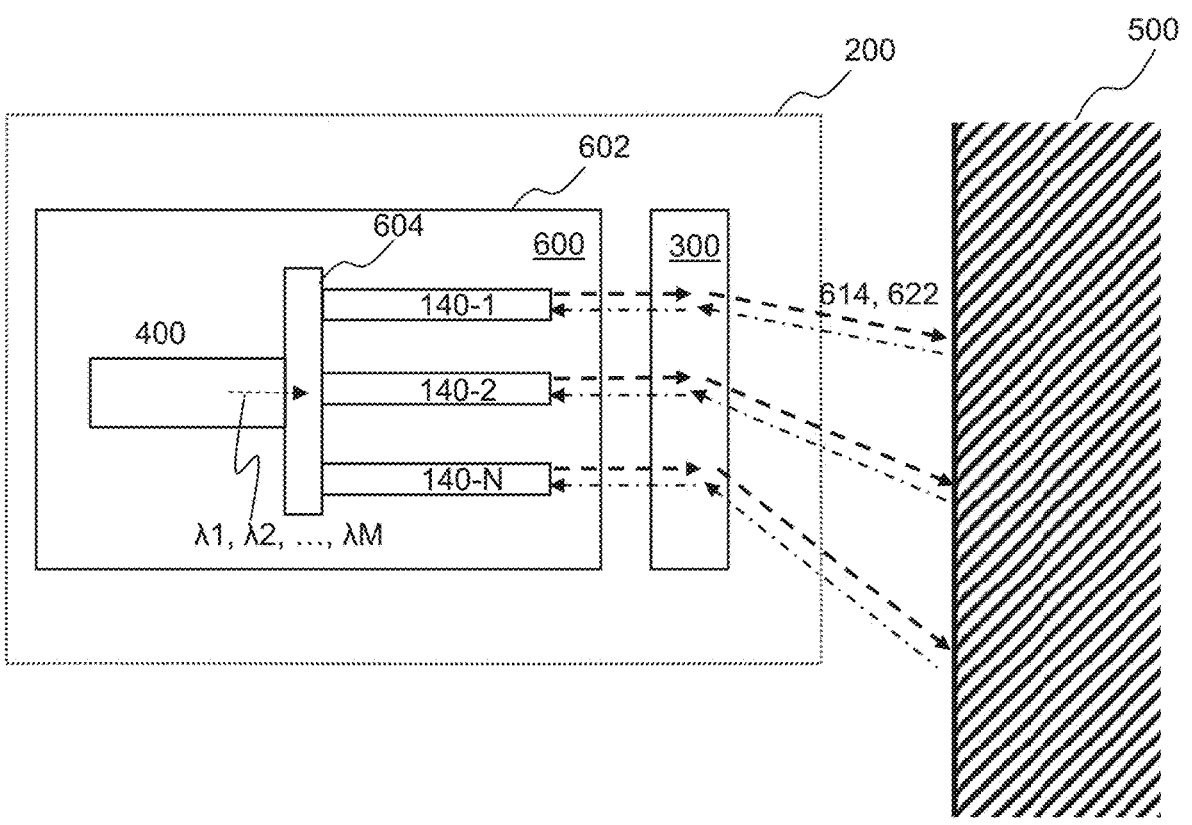
FIG. 6 illustrates a schematic diagram of a LIDAR system.

FIG. 6 illustrates a schematic diagram of a LIDAR system 200. The LIDAR system 200 includes photonic integrated circuit (PIC) 600 and an input/output structure 300 (also denoted as I/O structure or optical system) at least optically coupled to the PIC 600.

The photonic integrated circuit 600 may include a semiconductor photonic substrate 602. The semiconductor photonic substrate 602 may have integrated therein at least one light receiving input 604 to branch light received at the at least one light receiving input 604 to a first optical channel 140-1 and a second optical channel 140-2, e.g. of a plurality of optical channels 140-N.

The semiconductor photonic substrate 602 may be made of a semiconductor material, e.g. silicon or gallium nitride. The semiconductor photonic substrate 602 may be a common substrate, e.g. at least for the plurality of optical channels 140-N and the light source 400. The term "integrated therein" may be understood as formed at least in part from the material of the substrate and, thus, may be different to the case in which elements are formed, arranged or positioned on top of a substrate. The PIC includes a plurality of components located next to each other on the same (common) semiconductor substrate. The term "located next" may be interpreted as formed in or on the same (a common) semiconductor photonic substrate 602.

The PIC 600 may include at least one light source 400 integrated on, coupled to, or integrated in the substrate 602 and coupled to the at least one light receiving input 604. The light source 400 may be configured to emit a coherent electromagnetic radiation $\lambda_1, \lambda_2, \ldots, \lambda_M$, of one or more wavelength. Throughout this specification any kind of usable of "electromagnetic radiation" is denoted as "light" for illustration purpose only and even though the electromagnetic radiation may not be in the frequency range of visible light, infrared light/radiation or ultraviolet light/radiation.

The at least one light source 400 may be configured to provide coherent electromagnetic radiation (also denoted as coherent light) to a plurality of optical channels 140-$i$, e.g. laser radiation in a visible light spectrum, an infrared spectrum, a terahertz spectrum and/or a microwave spectrum. As an example "light" may be visible light, infrared radiation, terahertz radiation or microwave radiation, and the optical components of the LIDAR system 200 may be configured accordingly.

The light source 400 may be configured to be operated as a continuous wave laser and/or a pulsed laser. The light source 400 may be configured to be operated as a continuous wave (CW) laser, e.g. for frequency modulated continuous wave (FMCW) LIDAR in which the frequency of the light input to the input 604 is swept or chirped, and/or a pulsed laser, e.g. for time-of-flight (TOF) LIDAR. However, the light source 400 may also be a CW laser, e.g. a CW laser diode, operated in a pulsed mode, e.g. quasi CW (QCW) laser.

The PIC 600 further includes the plurality of optical channels 140-$i$ each having an input port configured to receive back reflected light 622 from the target 500 and an output port configured to emit light 614 towards the target 500 (in the following also denoted as I/O ports). The I/O ports may be configured according to the PIC and LIDAR layout and design, e.g. according to a monostatic LIDAR having shared I/O ports per light path or a bistatic LIDAR having separated input and output ports per light path.

The one or more outputs I/O of the I/O structure 300 may be configured to emit electromagnetic radiation of the light source 400 to different parts of a target 500, e.g. at the same time or subsequently, e.g. along one or more optical channels 140-$i$, through the optical system 300 including the aligned lens system (as described above) as illustrated in FIG. 6. This way, light emitted by the output I/O of the PIC 600 samples different portions of the target (not the same pixel) 500 and/or different targets 500 at the same time and allows to adjust the vertical resolution. Thus, light reflected 622 from the target 500 and detected by a photo detector of different light paths contains information correlated to different portions of a target (not the same pixel) and/or different targets at the same time. In other words, a plurality of optical channels 140-N emit light into different directions in space. Thus, precise alignment of the lens system of the optical system 300 relative to the PIC 600 is important for the efficiency of the LIDAR system 200.

As an example, the optical system 300 may include the lens system fixed to the PIC 600 as described above. The optical system 300 may further include a grating, a quarter wave plate, and a scanning mirror.

The lens and the grating may be optically arranged to guide light 614 from the output of the PIC 600 to the outside of the LIDAR system 200. The grating structure may be optically arranged to guide light from lens to the outside of the LIDAR system 200.

The grating structure may be a transmission grating, a reflective grating, or a grism.

The lens system may include one or more lens arranged in a housing 206 (also denoted as lens barrel). The lens system may include any one of a converging lens, a collimating lens or a diverging lens.

As an example, the lens system may be configured and/or may be provided such that light from the outputs I/O of the optical channels 140-$i$ of the plurality of optical channels 140-N have different angles of inclination on a (planar) grating structure. However, the function of the lens system and of the grating structure may also be integrated in a single optical element, e.g. a lens-shaped grating. In this case, the lens-shaped grating is mounted in front of the PIC 600 using the mounting connection 100. The purpose of the lens and the grating may be to emit parallel light 614 from the outputs I/O of the optical channels 140-$i$ into different directions in space at the same time and receive the light 622 back reflected from a target 500.

A scan mirror may be arranged in the optical channel 140-$i$ between the grating structure and the outside of the LIDAR system 200. The scan mirror may be configured to be movable, e.g. rotatable, to scan the environment of the LIDAR system 200. Alternatively, or in addition, the grating structure may be configured to be movable, e.g. a movable reflection grating.

Further, a quarter wave plate (QWP) or half wave plate (HWP) may be arranged in the light path between the grating structure and the scan mirror.

The LIDAR system 200 may further include a controller. The controller may be configured to control various electronic components, e.g. the light source, optical amplifiers, or other controllable optical components, e.g. a shutter. The controller may be an application specific integrated circuit (ASIC), as an example. The controller may be formed from, integrated in or mounted to the semiconductor photonic substrate 602. However, the controller may also be located outside of the PIC 600.

Using a multiple (M) wavelength light source 400 and the grating structure, the number of LIDAR channels may be increased by a factor of M for a given PIC 600 to achieve a desired high number (for example more than 16, e.g. more than 32) of vertical resolution elements or pixels. Hence, a high-performance coherent LIDAR system 200 is achieved. In general, using N parallel optical channels 140-N and M wavelengths in a wavelength-multiplexed LIDAR system 200 results in a total of M*N angular outputs. Hence, the LIDAR system 200 may have a high (>1 M pixels/s) overall or effective data rate. The number of PIC channels N to increase the number of vertical resolution elements (or reduce the cost by using fewer or smaller PICs) is readily scalable. The coherent LIDAR with the light source 400 implemented on a silicon PIC will (uniquely) enable the high performance and pricing required by customers for autonomous vehicle applications. The wavelengths provided from the light source 400 may differ by a few Å to a few nm from each other, as an example. The LIDAR system 200 may include one or more light source(s) 400 configured to emit electromagnetic radiation of different/multiple wavelengths/frequencies. Thus, precise alignment of the lens system in front of the PIC 600 is of importance for the efficiency and stability of the LIDAR system 200.

Figure 7:
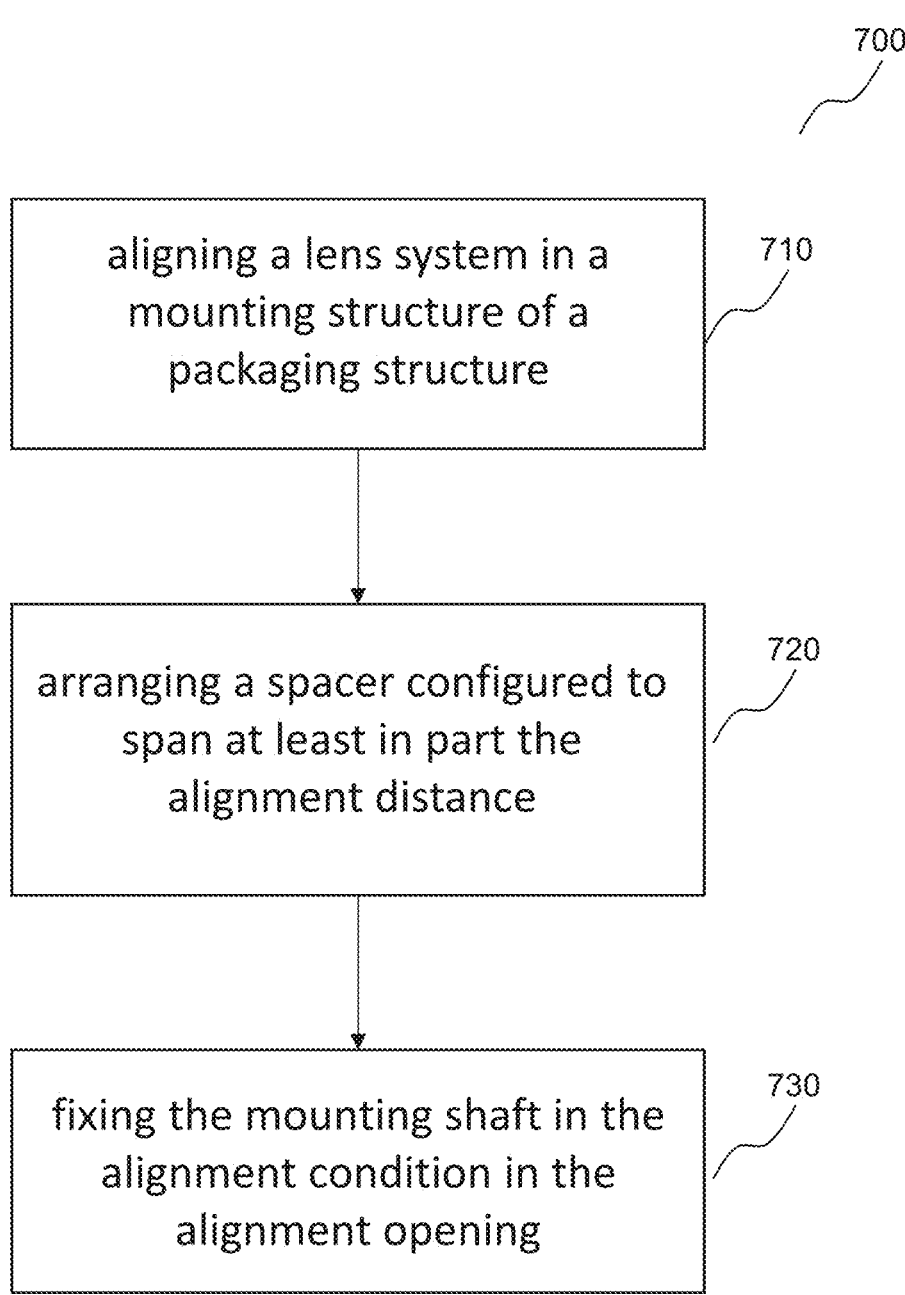
FIG. 7 illustrates a flow diagram of a method of forming a mounting connection.

FIG. 7 illustrates a flow diagram of a method 700 to form a mounting connection 100 of a lens system 220 in a mounting structure 112 of a LIDAR 200 system. The method may include aligning 710 a lens system 220 in a mounting structure 112 of a packaging structure 404, wherein the lens system 220 may be arranged in the mounting structure 112 according to a predefined alignment condition on or above an optical window of the packaging structure 404; wherein the mounting structure 112 may include at least one alignment opening 320, and the lens system 220 may include a mounting shaft 114 configured to mount the lens system 220 in the mounting structure 112, wherein the mounting shaft 114 may be arranged in the alignment opening 320 that the alignment opening 320 laterally surrounds the mounting shaft 114 at least in part spaced apart in an alignment distance from the mounting shaft in the predefined alignment condition; and arranging 720 a spacer 104 configured to span at least in part the alignment distance, wherein the mounting shaft 114 may be fixed 730 in the alignment condition in the alignment opening 320 by forming a first welding connection 106, 302, 312 that fixes the spacer 104 to the mounting structure 112, and by forming a second welding connection 102, 306, 316 that fixes the spacer 104 to the mounting shaft 114.

The predefined alignment condition may include a predefined orientation of the lens system 220 regarding the optical window.

Forming the first welding connection 106, 302, 312 may include welding connections at laterally opposing positions regarding the mounting shaft 114. The welding connections at laterally opposing positions may be formed at the same time, e.g. using dual beam laser welding.

Forming the second welding connection 102, 306, 316 may include welding connections at laterally opposing positions regarding the mounting shaft 114. The welding connections at laterally opposing positions may be formed at the same time.

EXAMPLES

The examples set forth herein are illustrative and not exhaustive.

Example 1 is a light detection and ranging system that may include a mounting connection of a lens system in a mounting structure. The light detection and ranging system may include: a packaging structure that may include an optical window and the mounting structure, a lens system mounted in the mounting structure, wherein the lens system may be arranged in the mounting structure according to a predefined alignment condition on or above the optical window. The mounting connection may include that the mounting structure may include at least one alignment opening, and the lens system may include a mounting shaft configured to mount the lens system in the mounting structure, wherein the alignment opening laterally surrounds the mounting shaft at least in part spaced apart in an alignment distance from the mounting shaft in the predefined alignment condition; and may include a spacer configured to span at least in part the alignment distance, wherein the mounting shaft may be fixed in the alignment condition in the alignment opening by a first connection that fixes the spacer to the mounting structure, and by a second connection that fixes the spacer to the mounting shaft.

In Example 2, the subject matter of Example 1 can optionally include that the first connection may be a first welding connection and the second connection may be a second welding connection.

In Example 3, the subject matter of Example 1 or 2 can optionally include that the alignment distance may be larger than 50 µm, e.g. the alignment distance may be in a range of about 100 µm to 1 mm.

In Example 4, the subject matter of any one of Examples 1 to 3 can optionally include that the mounting shaft may be arranged along an optical axis of the lens system, e.g. perpendicular to a lens focus axis of the lens system. As an example, the mounting structure, including the alignment structures, the spacer(s), the first connection, the second connection, may be designed that the lens system and the light source align within a margin along an optical axis of the lens system. The focus axis may be an optical axis.

In Example 5, the subject matter of any one of Examples 1 to 4 can optionally include that the first connection may include welding connections at laterally opposing positions regarding the mounting shaft.

In Example 6, the subject matter of any one of Examples 1 to 5 can optionally include that the second connection may include welding connections at laterally opposing positions regarding the mounting shaft.

In Example 7, the subject matter of any one of Examples 1 to 6 can optionally include that the spacer may include the shape of a ring or a washer.

In Example 8, the subject matter of any one of Examples 1 to 7 can optionally include that the spacer may include an opening, wherein the mounting shaft may be arranged in the opening.

In Example 9, the subject matter of any one of Examples 1 to 8 can optionally include that the mounting shaft may be spaced apart in at least in part in a second distance from the spacer.

In Example 10, the subject matter of Example 10 can optionally include that the second distance may be less than about 50 µm.

In Example 11, the subject matter of any one of Examples 1 to 10 can optionally include that the spacer may include a step-like or tapered shape forming a step-like or tapered structure from a surface of the mounting structure towards a distal end of the mounting shaft.

In Example 12, the subject matter of any one of Examples 1 to 11 can optionally include that the mounting shaft may include a cylindrical shape.

In Example 13, the subject matter of any one of Examples 1 to 12 can optionally include a photonic integrated circuit arranged in the packaging structure, the photonic integrated circuit configured to emit a coherent electromagnetic radiation through the optical window to the outside and to receive a coherent electromagnetic radiation from the outside through the optical window at the photonic integrated circuit.

In Example 14, the subject matter of any one of Examples 1 to 13 can optionally include that the lens system may include a plurality of lens arranged in a housing.

In Example 15, the subject matter of any one of Examples 1 to 14 can optionally include that the packaging structure may include a gold box.

In Example 16, the subject matter of any one of Examples 1 to 15 can optionally include a first mounting connection and a second mounting connection each configured according to any one of Examples 1 to 15, wherein the mounting shaft of the first mounting connection may be coupled to a first side of the lens system and wherein the mounting shaft of the second mounting connection may be coupled to a second side of the lens system about perpendicular to the first side of the lens system.

In Example 17, the subject matter of Example 16 can optionally include that the alignment opening of the first mounting connection and the alignment opening of the second mounting connection may be arranged on the same side of mounting structure, e.g. adjacent or next to each other.

Example 18 is a vehicle that may include a LIDAR system of any one of Examples 1 to 17.

In Example 19, the subject matter of Example 18 can optionally include that the vehicle may be an unmanned aerial vehicle.

Example 20 is a method to form a mounting connection of a lens system in a mounting structure of a light detection and ranging system. The method may include aligning a lens system in a mounting structure of a packaging structure, wherein the lens system may be arranged in the mounting structure according to a predefined alignment condition on or above an optical window of the packaging structure; wherein the mounting structure may include at least one alignment opening, and the lens system may include a mounting shaft configured to mount the lens system in the mounting structure, wherein the mounting shaft may be arranged in the alignment opening that the alignment opening laterally surrounds the mounting shaft at least in part spaced apart in an alignment distance from the mounting shaft in the predefined alignment condition; and arranging a spacer configured to span at least in part the alignment distance, wherein the mounting shaft may be fixed in the alignment condition in the alignment opening by forming a first connection that fixes the spacer to the mounting structure, and by forming a second connection that fixes the spacer to the mounting shaft.

In Example 21, the subject matter of Example 20 can optionally include that the predefined alignment condition may include a predefined orientation of the lens system regarding the optical window.

In Example 22, the subject matter of Example 20 or 21 can optionally include that forming the first connection may include welding connections at laterally opposing positions regarding the mounting shaft.

In Example 23, the subject matter of Example 22 can optionally include that the welding connections at laterally opposing positions may be formed at the same time.

In Example 24, the subject matter of any one of Examples 20 to 23 can optionally include that forming the second connection may include welding connections at laterally opposing positions regarding the mounting shaft.

In Example 25, the subject matter of Example 24 can optionally include that the welding connections at laterally opposing positions may be formed at the same time.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A light detection and ranging system comprising a mounting connection of a lens system in a mounting structure, the light detection and ranging system comprising:

a packaging structure comprising an optical window and the mounting structure:

a lens system mounted in the mounting structure, wherein the lens system is arranged in the mounting structure according to a predefined alignment condition on or above the optical window;

wherein the mounting structure comprises at least one alignment opening, and the lens system comprises a mounting shaft configured to mount the lens system in the mounting structure, wherein the alignment opening laterally surrounds the mounting shaft, wherein the mounting structure is, at least in part, spaced apart in an alignment distance from the mounting shaft in the predefined alignment condition; and wherein the mounting connection comprises a spacer configured to span over, at least in part, a top of the alignment distance, wherein the mounting shaft is fixed in the alignment condition in the alignment opening by a first connection that fixes the spacer to the mounting structure, and by a second connection that fixes the spacer to the mounting shaft.

2. The light detection and ranging system of claim 1, wherein the first connection is a first welding connection and the second connection is a second welding connection.

3. The light detection and ranging system of claim 1, wherein the alignment distance is larger than 50 μm.

4. The light detection and ranging system of claim 1, wherein the mounting shaft is arranged along an optical axis of the lens system.

5. The light detection and ranging system of claim 1, wherein the first connection comprises welding connections at laterally opposing positions regarding the mounting shaft.

6. The light detection and ranging system of claim 1, wherein the second connection comprises welding connections at laterally opposing positions regarding the mounting shaft.

7. The light detection and ranging system of claim 1, wherein the spacer is a ring-shaped spacer or a washer-shaped spacer comprising an opening.

8. The light detection and ranging system of claim 1, wherein the spacer comprises an opening, wherein the mounting shaft is arranged in the opening.

9. The light detection and ranging system of claim 1, wherein the mounting shaft is spaced apart in, at least in part, a second distance from the spacer.

10. The light detection and ranging system of claim 9, wherein the second distance is less than about 50 μm.

11. The light detection and ranging system of claim 1, wherein in the spacer comprises a step-like or tapered shape forming a step-like or tapered structure from a surface of the mounting structure towards a distal end of the mounting shaft.

12. The light detection and ranging system of claim 1, wherein the mounting shaft comprises a cylindrical shape.

13. The light detection and ranging system of claim 1, further comprising a photonic integrated circuit arranged in the packaging structure, the photonic integrated circuit configured to emit a coherent electromagnetic radiation through the optical window to the outside and to receive a coherent electromagnetic radiation from the outside through the optical window at the photonic integrated circuit.

14. The light detection and ranging system of claim 1, wherein the lens system comprises a plurality of lenses arranged in a housing.

15. The light detection and ranging system of claim 1, wherein the packaging structure comprises a gold box.

16. A light detection and ranging system comprising a first mounting connection and a second mounting connection each configured according to claim 1, wherein the mounting shaft of the first mounting connection is coupled to a first side of the lens system and wherein the mounting shaft of the second mounting connection is coupled to a second side of the lens system about perpendicular to the first side of the lens system.

17. The light detection and ranging system of claim 16, wherein the alignment opening of the first mounting connection and the alignment opening of the second mounting connection are arranged on the same side of mounting structure.

18. A vehicle comprising a light detection and ranging system of claim 1.

19. The vehicle of claim 18, wherein the vehicle is an unmanned aerial vehicle.

20. A method to form a mounting connection of a lens system in a mounting structure of a light detection and ranging system, the method comprising:

aligning a lens system in a mounting structure of a packaging structure, wherein the lens system is arranged in the mounting structure according to a predefined alignment condition on or above an optical window of the packaging structure;

wherein the mounting structure comprises at least one alignment opening, and the lens system comprises a mounting shaft configured to mount the lens system in the mounting structure, wherein the mounting shaft is arranged in the alignment opening that laterally surrounds the mounting shaft, wherein the mounting structure is, at least in part, spaced apart in an alignment distance from the mounting shaft in the predefined alignment condition; and arranging a spacer configured to span over, at least in part, a top of the alignment distance, wherein the mounting shaft is fixed in the alignment condition in the alignment opening by forming a first connection that fixes the spacer to the mounting structure, and by forming a second connection that fixes the spacer to the mounting shaft.

21. The method of claim 20, wherein the predefined alignment condition comprises a predefined orientation of the lens system regarding the optical window.

22. The method of claim 20, wherein forming the first connection comprises welding connections at laterally opposing positions regarding the mounting shaft.

23. The method of claim 22, wherein the welding connections at laterally opposing positions are formed at the same time.

24. The method of claim 20, wherein forming the second connection comprises welding connections at laterally opposing positions regarding the mounting shaft.

25. The method of claim 24, wherein the welding connections at laterally opposing positions are formed at the same time.

* * * * *